(No Model.) 4 Sheets—Sheet 1.

J. HOLMES, H. E. TANKARD & W. SCAIFE.
APPARATUS FOR REMOVING FAT FROM WOOL WASHINGS.

No. 579,581. Patented Mar. 30, 1897.

(No Model.) 4 Sheets—Sheet 3.

J. HOLMES, H. E. TANKARD & W. SCAIFE.
APPARATUS FOR REMOVING FAT FROM WOOL WASHINGS.

No. 579,581. Patented Mar. 30, 1897.

Witnesses

Inventors
James Holmes,
Herbert Edward Tankard
William Scaife
by
Attorneys

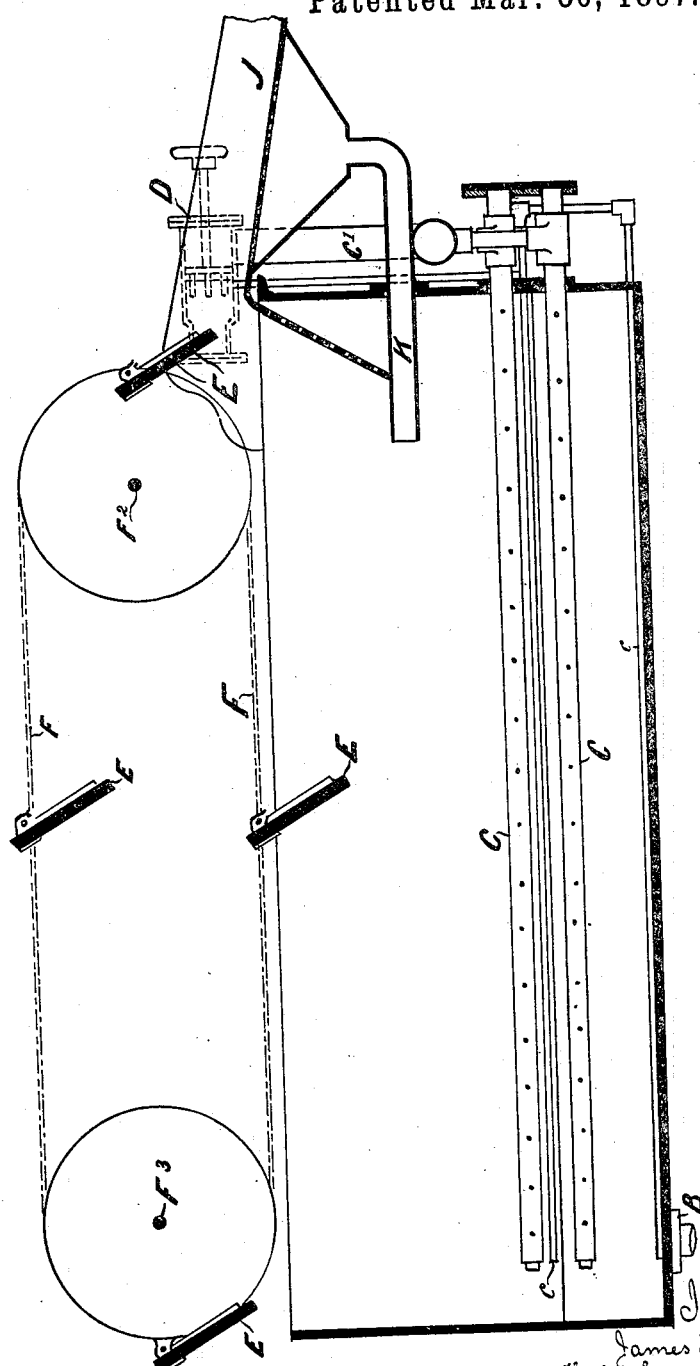

UNITED STATES PATENT OFFICE.

JAMES HOLMES, HERBERT E. TANKARD, AND WILLIAM SCAIFE, OF BRADFORD, ENGLAND.

APPARATUS FOR REMOVING FAT FROM WOOL WASHINGS.

SPECIFICATION forming part of Letters Patent No. 579,581, dated March 30, 1897.

Application filed April 7, 1896. Serial No. 586,552. (No model.) Patented in England September 30, 1895, No. 18,239.

*To all whom it may concern:*

Be it known that we, JAMES HOLMES, residing at 43 Princeville Street, and HERBERT EDWARD TANKARD and WILLIAM SCAIFE, residing at Wellington Mills, Laisterdyke, Bradford, in the county of York, England, subjects of the Queen of Great Britain and Ireland, have invented a new or Improved Apparatus for Removing Fatty Matters from the Effluent Waters of Wool-Washing Machines and the Like, (for which we have obtained provisional protection in Great Britain, No. 18,239, bearing date September 30, 1895,) of which the following is a specification.

It has for its object the removal of fatty matters or grease from the effluent waters of wool-washing machines and the like. Hitherto the fatty matters in such waters have been usually removed by a process which consists in running the water into settling-tanks, in which it is neutralized by an acid, the fatty matter contained in the magma thus formed being expressed therefrom or extracted by a solvent.

This invention consists in subjecting the effluent water from the said machine to the operation of an air-blast. For this purpose the effluent water is run into a tank or tanks fitted with perforated pipes or conductors, through which a current of air is forced. By thus agitating the liquid a froth or foam is formed containing the fatty matters, which is removed from the surface of the liquid by means of scrapers or an endless band.

In order to fully explain our invention, we append hereto sheets of drawings marked with letters of reference illustrating same.

Figure 1:
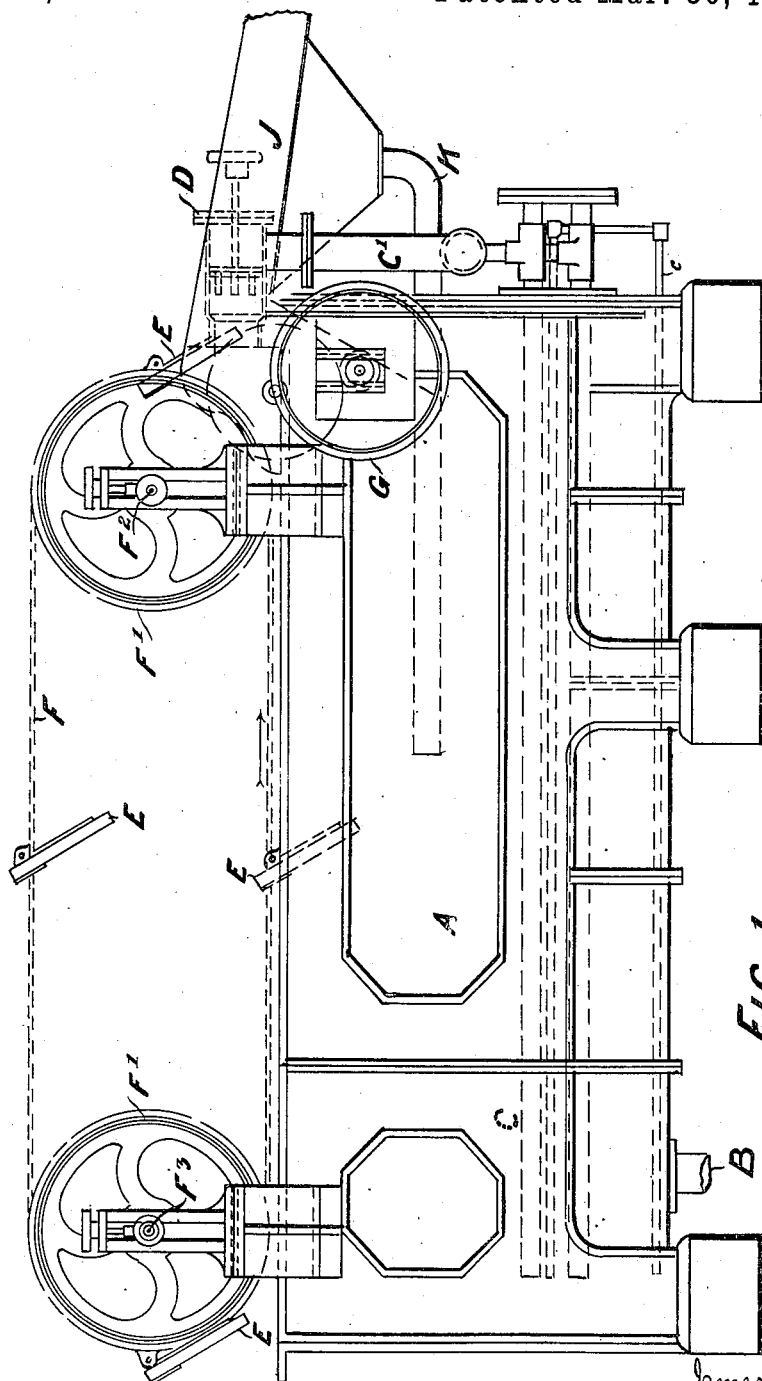
Figure 2:
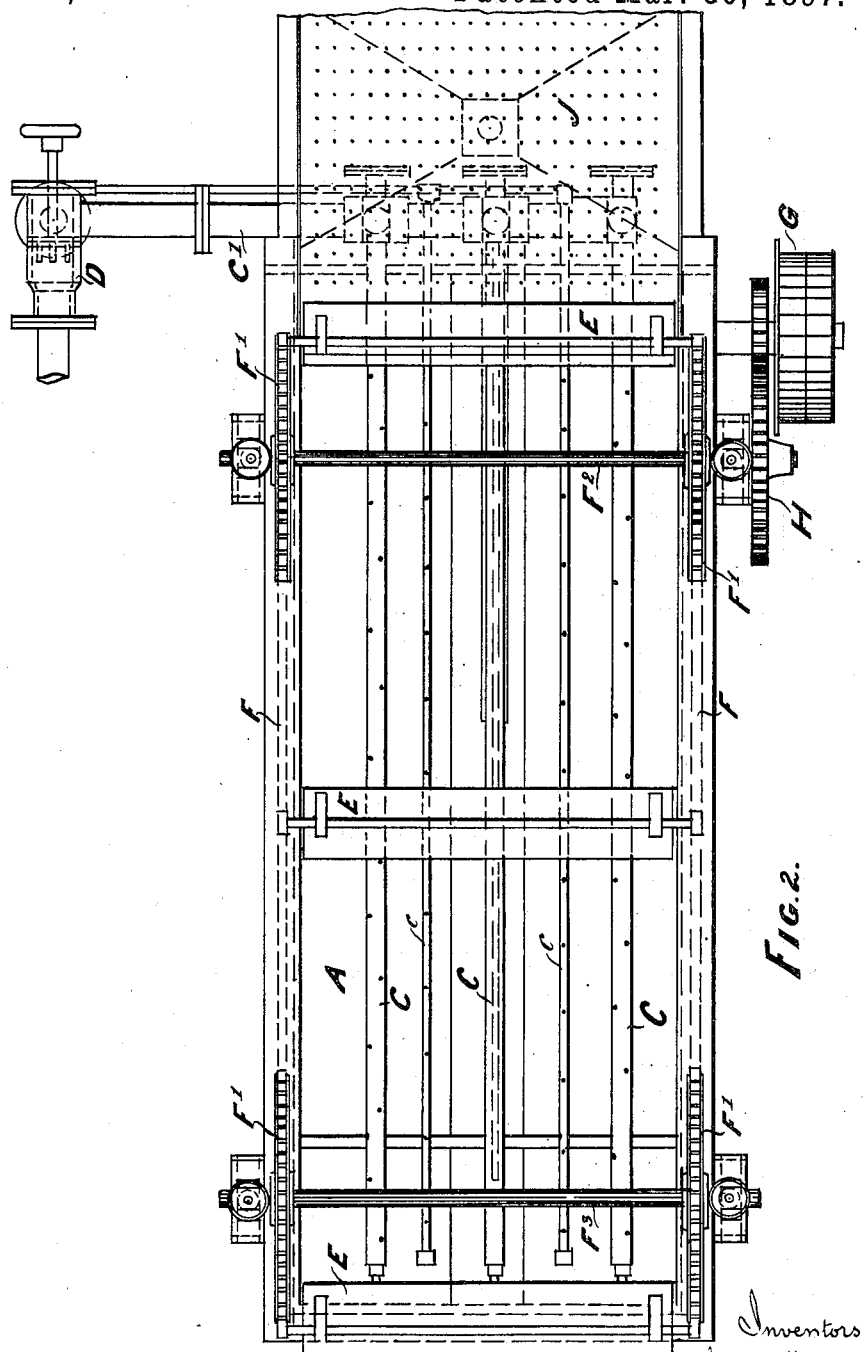
Figure 3:
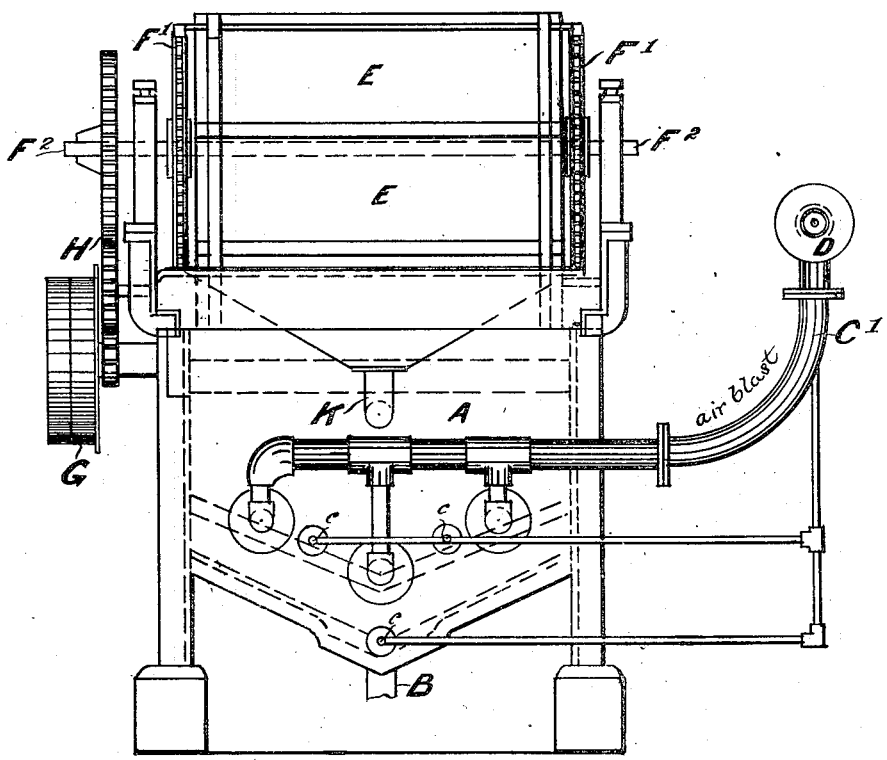

Figure 1 is a side elevation of our apparatus for removing the fatty matters from the effluent waters of wool-washing machines. Fig. 2 is a plan of same; Fig. 3, an end view, and Fig. 4 a longitudinal section.

The effluent water is run into a tank A, constructed with a sloping bottom, so that the liquid and any sludge that may collect in the tank may eventually after treatment be run out through a pipe B. The perforated pipes fitted in the tank are marked C and are connected to a fan or blower by the pipe C', the said pipe being carried to a higher point than the level of the liquid in the tank.

D is a stop-valve by which the air-blast is shut off when required.

Small subsidiary air-pipes $c$ are fixed at the lowest portion of the tank in order to blow up the sludge that collects at the bottom of the tank, so that the liquor and any sludge that may collect can all be run out of the tank through the pipe B.

E are scrapers attached to endless chains F, which gear with chain-wheels F', secured to shafts $F^2$ and $F^3$. The said shafts are mounted in suitable bearings, and the shaft $F^2$ is rotated from the driving-pulley G by gearing H, the scrapers E being thus continually traversed, in the direction of the arrow, over the surface of the liquor, whereby the froth or foam created by the agitation of the air-blast is removed therefrom and delivered onto a perforated chute J, so arranged that any liquid brought over by the scrapers flows back into the tank through the pipe K, while the more solid froth or foam drops over the end of the chute into a suitable receptacle or tank.

The froth or foam after its removal from the tank may be neutralized by sulfuric acid and the fatty matters recovered either by pressure or by means of solvents, or any other well-known means may be employed.

The froth or foam created by the air-blast being almost entirely composed of fatty matters, it is obvious that to recover the same a much less quantity of acid is required than when acid is added to the effluent water before the fatty matters have been concentrated in the form of a froth or foam.

The length of time the effluent water is subjected to the action of the air-blast depends upon the amount of the fatty matters contained in the water. The air-blast is, however, kept on until a froth or foam ceases to rise to the surface of the liquid. When no froth or foam rises to the surface of the liquid, the fatty matters have been removed and the water freed from same is then run to waste.

The addition of a small amount of sulfuric acid—about one quart to four hundred gallons of the effluent water—causes the froth or foam to rise more quickly to the surface of the liquid. In order to keep up the level of the liquid in the tank, it is requisite to run in an amount of liquid equal to the amount of the froth or foam which is removed by the scrapers.

The perforated pipes C are made with movable end covers, so that any deposit collecting there may be readily removed.

Having now described our invention, what we claim as new, and desire to secure by Letters Patent, is—

1. In combination in a machine for removing fatty matters from effluent waters of wool-washing machines, a tank adapted to contain the effluent water, air-blast pipes in said tank to produce foam or froth on the surface of the water and scrapers extending from side to side of the tank and operating at the surface of the water to remove the said froth, substantially as described.

2. In combination in a machine for removing fatty matters from effluent waters of wool-washing machines, the tank, a pipe leading thereto for conveying the effluent water from a wool-washing machine, the air-blast pipe extending into the tank to produce froth and foam at the surface of the water, said tank having a discharge for the said froth and foam and scrapers extending from side to side of the tank and operating along the surface of the water to move the froth to the discharge-spout, substantially as described.

3. In combination in a machine for removing fatty matters from effluent waters of wool-washing machines, the tank, the air-pipe therein to produce froth at the surface of the water, the scrapers, and the discharge-spout for the froth having a return-pipe leading into the tank, substantially as described.

In witness whereof we have hereunto set our hands in presence of two witnesses.

JAMES HOLMES.
HERBT. E. TANKARD.
WILLIAM SCAIFE.

Witnesses:
J. SIDNEY CRITCHLEY,
R. G. THOMPSON.